May 30, 1950
H. G. BUSIGNIES ET AL
2,509,208
DIRECTION FINDER SYSTEM
Filed July 16, 1945
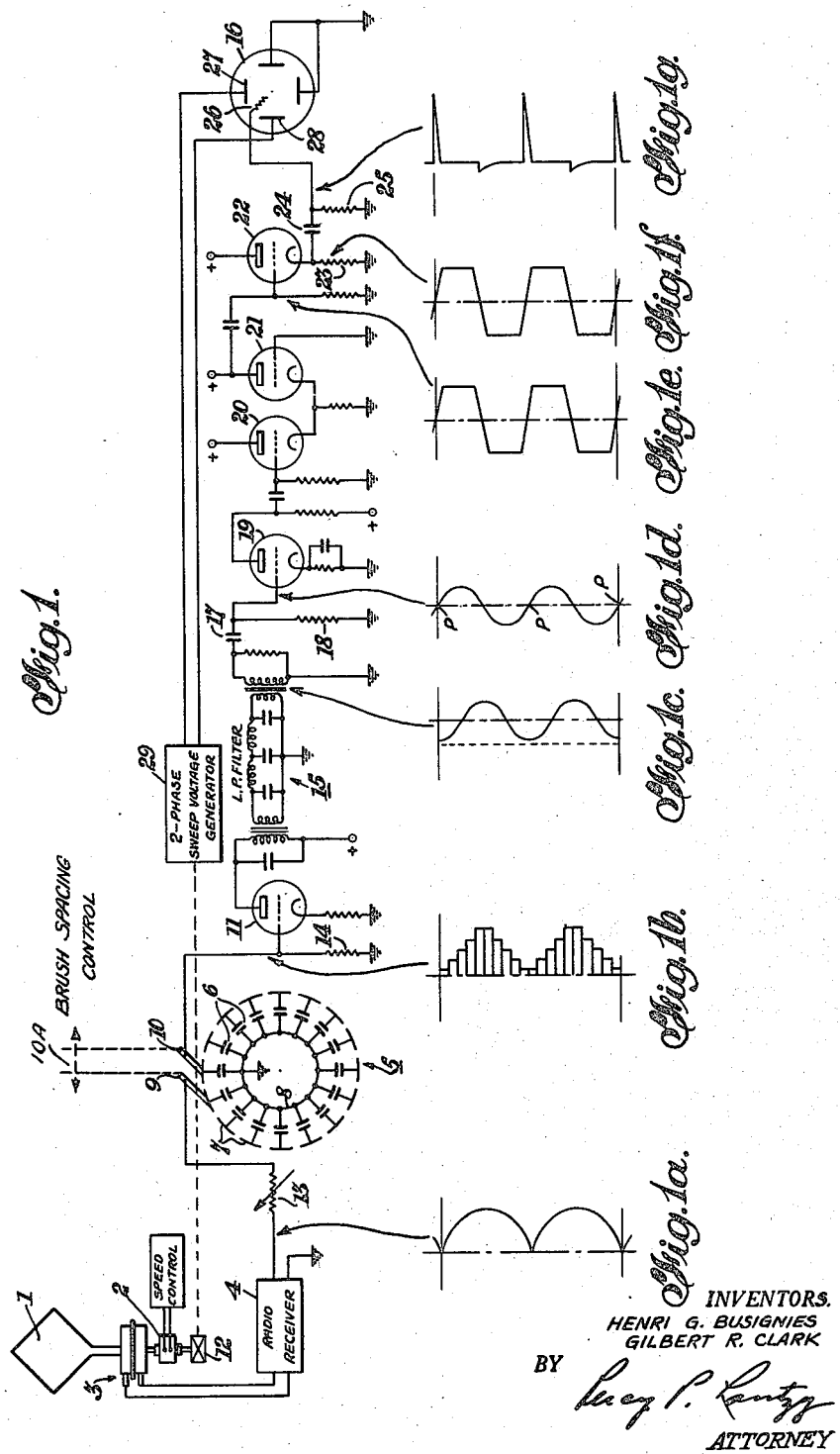
INVENTORS.
HENRI G. BUSIGNIES
GILBERT R. CLARK
BY
ATTORNEY Patented May 30, 1950

2,509,208

UNITED STATES PATENT OFFICE 2,509,208

DIRECTION FINDER SYSTEM

Henri G. Busignies, Forest Hills, and Gilbert R. Clark, Fort Wadsworth, N. Y., assignors to Federal Telephone and Radio Corporation, New York, N. Y., a corporation of Delaware Application July 16, 1945, Serial No. 605,418

11 Claims. (Cl. 343—118)

This invention relates to wave signalling systems and more especially to methods and means for deriving waves of a desired wave shape from corresponding waves of a different shape.

In certain of the signalling arts, for example in the art of direction finding, it is highly important to be able to derive sharp pulsed waves from original received waves of smoothly rounded or broad wave shape. Direction finding arrangements may be roughly divided into two classes, those which operate on the null signal principle and those which employ a continuously rotating searcher or loop antenna. In the null method, slight amounts of noise voltage in the system adversely affect the reliability of the direction finding indications because the useful direction finding signal is very weak near the null points. In such system, it is a conventional practice to locate two points of equal voltage on either side of the null point but far enough removed from the null point so that an appreciably strong signal can be utilized. This method is not applicable to systems employing rotating loops or the like which are intended to produce instantaneous indications. Therefore, the problem of noise is still a serious one in such rotating loop systems.

Accordingly, it is a principal object of this invention to provide an improved direction finder system employing rotating loops or other rotating directionally sensitive pick-ups.

Another object is to provide a novel wave derivation system for producing narrow time base pulses exactly at the instants when the direction finder signals from the rotating pick-up are at their minima.

Another object is to provide a novel wave shaping system whereby broad time base signal waves can be converted into sharp and narrow time base pulses in exact time synchronism with the occurrence of the minima of the original waves.

Another object is to provide an improved indication control for direction finder systems of the rotatable loop type using a cathode ray tube indicator, whereby the control potential applied to the indicator is in the form of a series of sharp narrow time base pulses notwithstanding that the wave form of response of the loop signal is of the broad time base type.

A feature of the invention relates to a novel circuit arrangement for deriving narrow time base control pulses from original wide time base waves and with the pulses accurately time phased with respect to the original waves.

Another feature relates to a wave shape or derivation system employing a harmonic filter which is correlated and synchronized with remaining parts of the system.

A further feature relates to a wave shaping or derivation system employing in circuit sequence a harmonic filter, a low-pass filter, a wave limiter and a wave differentiating network for deriving sharp pulses from original wide time base signal waves.

A still further feature relates to the novel organization, arrangement and relative interconnection of parts which cooperate to produce an improved wave shaping circuit employing a harmonic filter.

Other features and advantages will be apparent after a consideration of the following detailed descriptions and the appended claims.

In the drawing which represents one preferred embodiment:

Fig. 1 is a schematic circuit diagram of a rotating loop direction finder system embodying the invention;

Figs. 1a to 1g are a series of curves which are correlated with certain parts of Fig. 1 to be explanatory thereof.

In Fig. 1, there is shown a rotatable direction finding antenna 1 which may be of any well-known kind, for example in the form of a loop which is arranged to be rotated at a predetermined speed by means of motor 2. The direction finding signals picked up by loop 1 as it rotates, are applied through a suitable brush and commutator arrangement 3, to the input of any well-known direction finder radio receiver 4. When the loop is in a certain position with respect to the arriving wave front, the detected signals in the output of the receiver 4 will undergo minima, and the general wave shape thereof will be as indicated in Fig. 1a.

If an instantaneous indicator such as a cathode ray tube oscilloscope is used to produce the directional indications at the instants of occurrence of the minima, it is necessary to convert the broad time base waves of Fig. 1a into sharp pulses or narrow time base waves such as shown in Fig. 1g, and at the same time it is necessary to insure that these sharp pulses occur exactly at the instants of the minima in the original detected waves (Fig. 1a).

In order to achieve these results, the detected waves from receiver 4 are applied to a harmonic filter 5 such as disclosed in application Serial No. 591,894, filed May 4, 1945, now abandoned, to which application reference can be had for a detailed description of several embodiments of a harmonic filter that may be used. This filter comprises for example, a bank of energy storage elements such as electrostatic condensers 6 which have their corresponding plates or terminals connected to respective individual commutator segments 7, and the other corresponding plates or terminals are connected to a common grounded bus bar 8. A pair of brushes 9, 10, make contact with the commutator segments, the brushes being spaced so as to provide required time delay between charge and discharge of the condensers. It will be understood that the brushes and commutator segments undergo relative rotational displacement so that the condensers are connected successively and cyclically in a charging circuit through brush 9 to the receiver 4. Likewise, the condensers are connected successively and cyclically in a discharging circuit through brush 10 leading to an amplifier tube 11. For this purpose, the commutator which carries segments 7 may be stationary, while the brushes 9 and 10 are insulatingly connected together and rotated as a unit around the commutator. In accordance with one phase of the invention, the rate of rotation of the brushes is synchronized with the rotation of loop 1. For this purpose, the loop driving motor 2 can be connected through suitable transmission gearing 12 to the shaft which carries the brushes 9 and 10, which shaft is schematically represented by the dotted line. Preferably, an adjustable resistor 13 is connected between receiver 4 and brush 9 to control the charging rate to the condensers 6. The brush 10 is returned to ground through a high resistance 14 so as not to affect the storage time of the energy in the various condensers. With such a harmonic filter the general character of the waves applied from brush 10 to the control grid of amplifier tube 11 is represented in Fig. 1b. The wave form in the output of the harmonic filter 5 will not exhibit sharp nulls, because of the presence of any noise voltages as well as because of the finite size of the commutator segments 7. Furthermore, there is present a certain amount of commutator ripple.

In order to eliminate the ripple and reduce the noise content, the waves from the output of tube 11 are applied to a low-pass filter 15, so that there exists at the output of the said filter 15 a wave shape such as represented in Fig. 1c. Filter 15 in addition to rounding out the nulls somewhat, also introduces a time delay in the wave form. We have found that this time delay can be corrected by a slight displacement of one of the brushes 9, 10 as indicated at 10A. The output of filter 15 is substantially noise-free and is applied to a wave differentiating network comprising condenser 17 and resistor 18, so that the points P of zero potential of the resultant differentiated wave along the positive slopes thereof, correspond in time exactly to the corresponding minima of the original wave form (Fig. 1a).

The wave of Fig. 1d is then applied to a suitable amplifier tube 19 whose output is applied to any well known form of symmetrical peak limiter comprising, for example, a pair of grid controlled tubes 20 and 21, which are arranged to square up the waves from tube 19 to render them symmetrical around the exact points of zero intercept as represented by Fig. 1e.

The squared waves from the double tube limiter 20, 21, are then applied, as indicated by Fig. 1f, to a cathode follower tube 22 having a cathode resistor 23. Thus a low impedance input is supplied to the wave differentiating network consisting of condensers 24 and 25. There appears at the output of this network 24, 25, a series of very narrow time base positive pulses (Fig. 1g) which are in exact time coincidence with the corresponding minima of the original detected waves (Fig. 1a).

The pulses of Fig. 1g can then be applied to the control grid 26 of a cathode ray tube oscilloscope 16, and the grid 26 can be suitably biased so that a luminous spot is not produced on the fluorescent screen of the tube 16 except when the positive pulses of Fig. 1g are applied to grid 26.

In order to indicate direction, the usual coordinate deflector plates or elements 27, 28, of the cathode ray tube, are supplied with beam deflecting potentials from a suitable two-phase sweep voltage generator 29 of any well-known construction, whereby the cathode ray beam is caused to follow a circular trace on the screen of tube 16. In accordance with the present invention, the generator 29 has its control member coupled by a suitable shaft to the motor 12 so that the cathode ray beam rotates in synchronism with the rotation of loop 1. It will be understood of course that the generator 29 may be an electronic tube generator or oscillator, the frequency control element of which is locked electrically or electro-mechanically to the motor 2.

If the loop 1 is rotated at more than 10 R. P. S., there will be produced ten or more pulses such as those of Fig. 1g, and because of the persistency of normal vision, a single spot will appear on the screen of the cathode ray tube and the position of this spot will correspond exactly with the position of loop 1, thus giving a directional indication of the source whose direction is to be determined.

It will be understood of course, that the invention is not limited to the use of an indicator of the cathode ray tube type. Furthermore, the indication is not necessarily limited to a circular trace. For example, the signal from the differentiating network 24, 25, instead of being applied to the control grid 26, can be superimposed on one of the deflector plates 27, 28. With this type of indication, a continuous luminous circle can be traced and a radial displacement of the trace will occur in synchronism with the positions of the loop 1 when it is parallel to the arriving wave front.

Various changes and modifications can be made without departing from the spirit and scope of the invention.

What is claimed is:

1. A direction finder system comprising a rotatable loop antenna, a direction finding radio receiver, a harmonic filter connected to the output of said receiver, a low-pass filter connected to said harmonic filter, means to adjust the harmonic filter to compensate for wave delay in said low-pass filter, means to convert the signals from the low-pass filter into narrow time base pulses, and a direction indicator to which said pulses are applied.

2. A direction finder system according to claim 1 in which said harmonic filter is of the type having a series of electric storage elements having a charging circuit recurrently and cyclically connected to the output of said receiver, and a discharging circuit recurrently and cyclically connected to said low-pass filter, and means for synchronizing said charging and discharging circuits with the rotation of said loop.

3. A direction finder system according to claim 1 in which said indicator comprises a cathode-ray tube, a sweep voltage generator connected to the deflecting elements of said tube, means to synchronize said generator with the rotation of said loop, and means to syncronize said harmonic filter with the rotation of said loop.

4. A direction finder system having in operative sequence a rotatable loop antenna, a radio receiver, a harmonic filter, a low-pass filter, a wave squaring device, a squared-wave differentiating device for producing narrow time base pulses therefrom, a cathode-ray tube to which said pulses are applied, and means to synchronize the loop rotation with the harmonic filter and with the beam deflection of the cathode-ray tube.

5. In a direction finder system, a cathode-ray tube indicator, a two-phase sweep generator for causing the beam of said tube to trace a circular path, means to receive direction finding signals in the form of broad time base waves having recurrent minima, means including a rotatable harmonic filter and a wave differentiating network for converting said signals into narrow time base pulses exactly in coincidence with said minima, and means to apply said pulses to a beam control electrode of said tube.

6. A direction finder system according to claim 5 in which means are provided to synchronize the rotation of the loop with said sweep generator and with said harmonic filter.

7. A wave derivation system for converting broad time base waves having recurrent voltage minima into narrow time base pulses in exact coincidence with said minima, including a harmonic filter of the type having a series of electric storage elements adapted to be recurrently charged under control of different portions of said waves, and recurrently discharged, a low-pass filter to which the discharge energy is applied, a differentiating network connected to the low-pass filter to cause alternate zero intercepts of the waves therefrom to be in exact coincidence with said minima, means to convert the waves from said differentiating network into square-topped waves, and a second wave differentiating network for converting said square-topped waves into narrow time base pulses in exact coincidence with said minima.

8. A wave derivation system according to claim 7 in which said harmonic filter includes a segmented commutator with the segments individually connected to the storage elements and a pair of brushes for contacting with said commutator, one of said brushes being connected to the charging circuit and the other brush being connected to the discharging circuit.

9. A wave derivation system according to claim 7 in which means are provided to produce said broad time base waves, and means to time the charging and discharging rate of said storage elements with the rate of recurrence of the minima of said broad time base waves.

10. In a direction finding system, a rotatable searching pick-up antenna, radio receiver means to detect direction finder signals picked up by said antenna, said detected signals having repeated voltage minima and being of broad time base wave shape, a direction finding indicator of the type which produces instantaneous indications, means to convert said signals into narrow time base pulses in exact time coincidence with said minima, and means to apply said pulses to said indicator to control the direction finding indications thereof, said converting means includes a harmonic filter of the type having a plurality of energy storage elements which are recurrently and cyclically charged and discharged.

11. In a direction finding system, a rotatable searching pick-up antenna, radio receiver means to detect direction finder signals picked up by said antenna, said detected signals having repeated voltage minima and being of broad time base wave shape, a direction finding indicator of the type which produces instantaneous indications, means to convert said signals into narrow time base pulses in exact time coincidence with said minima, and means to apply said pulses to said indicator to control the direction finding indications thereof, said converting means includes a harmonic filter of the type having a series of electric storage elements arranged to be recurrently and cyclically charged under control of said signals, and arranged to be discharged recurrently and cyclically, and means to synchronize the said charging and discharging rate with the rate of rotation of said antenna.

HENRI G. BUSIGNIES.
GILBERT R. CLARK.

REFERENCES CITED

The following references are of record in the file of this patent:

UNITED STATES PATENTS

| Number | Name | Date |
|---|---|---|
| 1,851,092 | Fetter | Mar. 29, 1932 |
| 1,933,219 | Nakajima et al. | Oct. 31, 1933 |
| 2,183,746 | Hyland | Dec. 19, 1939 |
| 2,186,268 | Pakala | Jan. 9, 1940 |
| 2,188,611 | Norton | Jan. 30, 1940 |
| 2,230,160 | Lehmann | Jan. 28, 1941 |
| 2,272,607 | Higgonet | Feb. 10, 1942 |

FOREIGN PATENTS

| Number | Country | Date |
|---|---|---|
| 468,918 | Great Britain | July 15, 1937 |
| 635,793 | Germany | Sept. 28, 1936 |
| 881,292 | France | Jan. 22, 1943 |